US008182342B2

(12) United States Patent
Guinchard et al.

(10) Patent No.: US 8,182,342 B2
(45) Date of Patent: May 22, 2012

(54) GUITAR SHAPED GAME CONTROLLER WITH REMOVABLE NECK

(75) Inventors: Lee Guinchard, Mountain View, CA (US); Stephen N. Withers, Kendel (GB); Jared Chan, Hong Kong (CN)

(73) Assignee: Activision Publishing, Inc., Santa Monica, CA (US)

( * ) Notice: Subject to any disclaimer, the term of this patent is extended or adjusted under 35 U.S.C. 154(b) by 1124 days.

(21) Appl. No.: 12/020,465

(22) Filed: Jan. 25, 2008

(65) Prior Publication Data
US 2009/0156306 A1     Jun. 18, 2009

Related U.S. Application Data

(63) Continuation of application No. 11/760,726, filed on Jun. 8, 2007, now abandoned.

(51) Int. Cl.
*A63F 9/24* (2006.01)
(52) U.S. Cl. .......................................................... 463/37
(58) Field of Classification Search ...................... 463/37
See application file for complete search history.

(56) References Cited

U.S. PATENT DOCUMENTS

| 3,012,800 | A | * | 12/1961 | Koch | 403/197 |
|---|---|---|---|---|---|
| 5,353,672 | A | | 10/1994 | Stewart | |
| 5,929,362 | A | | 7/1999 | Oteyza | |
| 6,028,255 | A | | 2/2000 | Myronyk | |
| 6,225,547 | B1 | | 5/2001 | Toyama et al. | |
| 7,375,267 | B2 | * | 5/2008 | Poschelk | 84/291 |
| 7,435,178 | B1 | * | 10/2008 | Tam et al. | 463/38 |
| 7,598,449 | B2 | * | 10/2009 | Sullivan | 84/646 |
| 2002/0152659 | A1 | * | 10/2002 | Hartill | 40/661 |
| 2003/0164080 | A1 | * | 9/2003 | Childress | 84/291 |
| 2006/0123971 | A1 | * | 6/2006 | Moghaddam | 84/290 |
| 2008/0220864 | A1 | * | 9/2008 | Brosius et al. | 463/33 |

FOREIGN PATENT DOCUMENTS

JP          2001-096061 A          4/2001

OTHER PUBLICATIONS

STIC Search.*
International Search Report on corresponding PCT application (PCT/US2008/066356) from International Searching Authority (KR) dated Apr. 3, 2009.
Written Opinion on corresponding PCT application (PCT/US2008/066356) from International Searching Authority (KR) dated Apr. 3, 2009.

* cited by examiner

*Primary Examiner* — Dmitry Suhol
*Assistant Examiner* — Malina K Rustemeyer
(74) *Attorney, Agent, or Firm* — Klein, O'Neill & Singh, LLP (57) ABSTRACT

A guitar shaped game controller with a removable neck. In one embodiment, the invention relates to a game controller for a video game system in the shape of a guitar, including a body section generally in the shape of a body of a guitar, the body section including a cutout and a first electrical connector, a latch arm structure coupled to the body section about the cutout, and a neck section generally in the shape of a guitar neck and a headstock, the neck section including, a portion insertable into the cutout of the body section, the portion including an indentation positioned so as to be approximate the latch arm structure when the portion is inserted into the cutout of the body section, the indentation configured to receive at least a portion of the latch arm structure, a second electrical connector having one or more contacts, the second electrical connector configured to couple with the first electrical connector when the portion is inserted into the cutout of the body section, and one or more fret buttons, where each of the one or more fret buttons is electrically connected to at least one of the one or more contacts.

23 Claims, 9 Drawing Sheets

GUITAR SHAPED GAME CONTROLLER WITH REMOVABLE NECK

CROSS-REFERENCE TO RELATED APPLICATION

The present application is a continuation of U.S. patent application Ser. No. 11/760,726, filed Jun. 8, 2007 now abandoned, and entitled GUITAR SHAPED GAME CONTROLLER WITH REMOVABLE NECK, the disclosure of which is hereby incorporated by reference as if set forth in full herein.

BACKGROUND OF THE INVENTION

The present invention relates generally to video game controllers, and more particularly to video game controllers having removable components.

Video games are commonly enjoyed by many, with video games being available in a number of genres and across a variety of themes. Video games generally provide a source of entertainment and allow users to virtually participate in activities and take on roles that may be unavailable within the constraints of daily life. Video games may also present opportunities to increase manual dexterity, improve hand/eye coordination, or even provide educational or learning experiences.

Video games are often played using a game console executing program instructions for the video game, with the game console coupled to a display for displaying video game elements and to a controller for providing input derived from user interaction with the controller. Some video games may use a computer system, such as a personal computer, with the computer system effectively providing for the functions of the game console, display and controller.

The video game controller is often a specialized device unique to a particular video game console or usable with several video game consoles. The use of a specialized device provides many benefits. The specialized device generally includes a variety of buttons, sticks and other input devices. The numerous input devices allow the video game controller to be used to provide a variety of control functions and to allow the specialized device to replicate use of a wide variety of real world devices. In addition, the specialized devices have a small footprint, increasing ease of shipment, storage, and display.

However, use of a specialized device may detract from an overall game experience. For example, the specialized device generally does not have physical similarity to many, if any, real world devices.

BRIEF SUMMARY OF THE INVENTION

The invention relates to a guitar shaped game controller with a removable neck. In one embodiment, the invention relates to a game controller for a video game system in the shape of a guitar, including a body section generally in the shape of a body of a guitar, the body section including a cutout and a first electrical connector, a latch arm structure coupled to the body section about the cutout, and a neck section generally in the shape of a guitar neck and a headstock, the neck section including, a portion insertable into the cutout of the body section, the portion including an indentation positioned so as to be approximate the latch arm structure when the portion is inserted into the cutout of the body section, the indentation configured to receive at least a portion of the latch arm structure, a second electrical connector having one or more contacts, the second electrical connector configured to couple with the first electrical connector when the portion is inserted into the cutout of the body section, and one or more fret buttons, where each of the one or more fret buttons is electrically connected to at least one of the one or more contacts.

In another embodiment, the invention relates to a guitar shaped game controller for a video game system in the shape of a guitar, including a body section generally in the shape of a body of a guitar, the body section including a cutout, a latch arm structure coupled to the body section about the cutout, and a neck section generally in the shape of a guitar neck and a headstock, the neck section at least partially insertable into the cutout of the body section, the neck section including an indentation positioned so as to be approximate the latch arm structure when the neck section is inserted into the cutout of the body section, the indentation configured to receive at least a portion of the latch arm structure.

In yet another embodiment, the invention relates to a video game system including a guitar shaped game controller for a video game system, including a body section generally in the shape of a body of a guitar, the body section including a cutout, and a neck section generally in the shape of a guitar neck and head, the neck section at least partially insertable into the cutout of the body section, the neck section including an indentation positioned so as to be approximate a latch arm structure when the neck section is inserted into the cutout of the body section, the indentation configured to receive at least a portion of the latch arm structure, a game console configured to play a video game stored on a game media source and to receive data from the guitar shaped game controller, and a display configured to receive data from the game console.

In still yet another embodiment, the invention relates to a video game controller in the shape of a guitar, including a body having a strum bar on a front side thereof and hooks in the direction of the front side, a neck extending from the body, and a face plate having an outline substantially corresponding to the front side of the body, with hooks extending from a rear of the face plate, the hooks positioned to engagably release the hooks of the body, the face plate further including a cutout for passage therethrough of at least a portion of the strum bar.

These and other aspects of the invention are more fully comprehended upon study of this disclosure.

DETAILED DESCRIPTION

In some embodiments the invention provides guitar shaped game controllers having a removable neck for use with a video game system which includes a game console and display. The guitar shaped game controllers can be used to play one or more video games on the video game system. The guitar shaped controllers can have the same size as a real world acoustic or electric guitar. Given the lengthy body of an acoustic or electric guitar, the guitar controllers modeled thereafter can be difficult to store and package for sale. The long necks in particular can be bulky. Adding a box around the guitar controller for shipping demands even more space. The box can require expensive shelf space in a store.

In comparison, guitar shaped game controllers having removable necks can be far more convenient. The packaging length can be effectively reduced by up to half, which reduces the cost of displaying an item on a store shelf. In the case of failure, a removable neck can easily be replaced. In some cases, users of guitar controllers can swap removable necks from one guitar controller to another. Traveling with a guitar controller having a removable neck is much easier as many methods of transport limit the size of lengthy luggage.

Embodiments of guitar shaped game controllers having removable necks have latching structures that allow a user to attach and remove the neck from the body of the guitar controller. The latching system can include a release arm and retaining arm. The retaining arm can be configured to engage a notch on the neck as the neck is inserted into the body. Once inserted, the neck can be secured to the body by the retaining arm. The release arm can be used to release and remove the neck. Electrical connectors on both the neck and body can allow connection to components in the neck such as fret buttons.

Embodiments of guitar shaped game controllers can have other removable components. For example, the front panel of the guitar or face plate can be removed by the user for customization or other reasons. Other components on the guitar controller can be removable, such as the fret buttons. In this way, the user of the guitar controller can completely tailor the controller to suit the purposes or style of the user.

Embodiments of guitar shaped game controllers having removable necks are used in game play. In conjunction with a game console and display, the guitar controllers can allow a game player or user to simulate playing a real guitar at a particular location and in front of a simulated crowd. Visual indicators provide instruction as to how and when to play certain notes on the guitar. Scoring and crowd feedback indicators provide the user with real time performance information.

Figure 1:
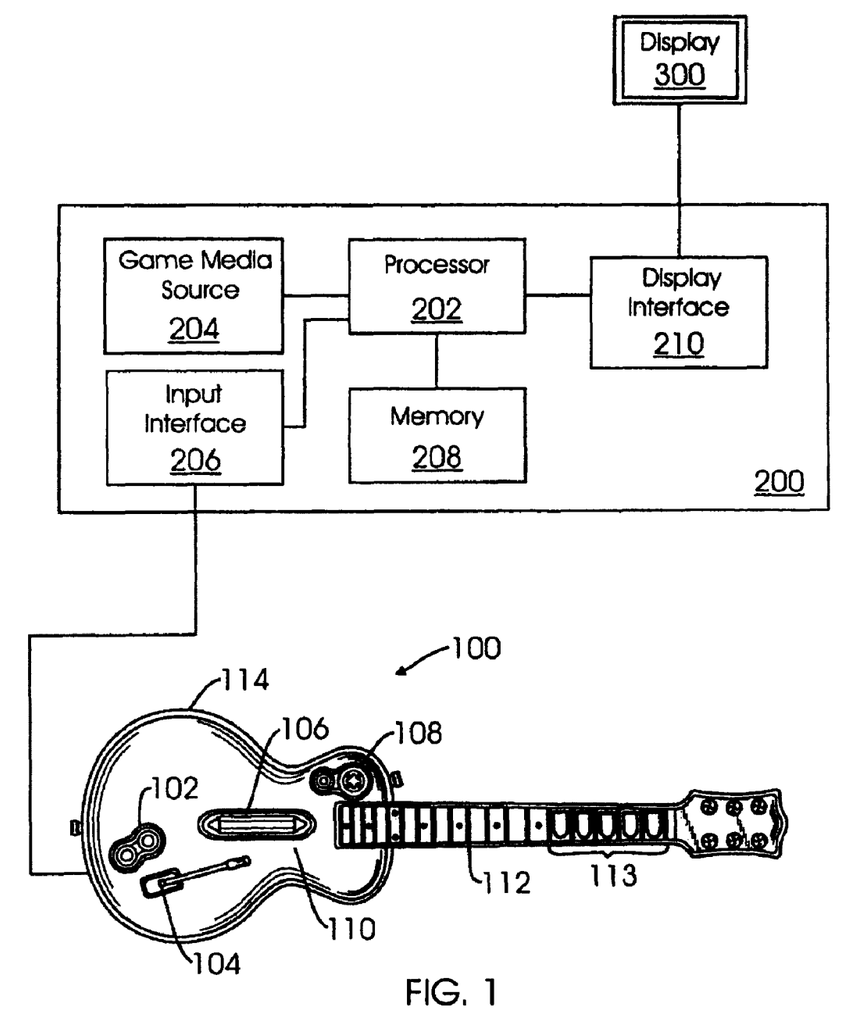
FIG. 1 is a schematic block diagram of a video game system including a guitar shaped game controller in accordance with aspects of the invention.

FIG. 1 is a schematic block diagram of a video game system including a guitar shaped game controller in accordance with aspects of the invention. The video game system includes a guitar shaped game controller 100, a game console 200 and a display 300. In operation, the game console provides video game operation based on inputs from the guitar shaped game controller, with video game status displayed on the display.

The game console includes a processor 202. The processor is configured to execute a video game by program instructions in a memory 208 associated with the processor. The video game instructions are normally stored in a game media source 204, and transferred to the memory as appropriate, for example, as commanded by the processor. The game console also includes a display interface 210 and an input interface 206. The display interface is configured to receive display related information from the processor, and to provide display data to the display. The input interface 206 is configured for exchanging information with the guitar shaped game controller 100.

The guitar shaped game controller 100 includes a body 114 and a removable neck 112. The guitar body includes a strum bar 106 for replicating strumming of a guitar. The body also includes a tremolo arm 104 for providing whammy effects and select buttons 102 for providing an input mechanism for game start and other functions. A front face plate 110 is removably coupled to and substantially covers a front face of the body. As illustrated in FIG. 1, the front face includes cutouts for components of the guitar. The removable neck includes fret buttons 113 mounted on the front side of the neck. In a common embodiment, the fret buttons each have a different color. As illustrated, the embodiment of FIG. 1 includes five fret buttons; other embodiments may have 3, 4, 6 or other numbers of fret buttons. In one embodiment, components of guitar shaped game controllers are made of plastic or similar materials.

In one embodiment, the guitar shaped game controller is the roughly the same size as a typical electric or acoustic guitar. In another embodiment, the guitar shaped game controller is smaller than a typical electric or acoustic guitar. In other embodiments, the guitar shaped game controller can have other sizes. In some embodiments, the guitar controller has a shape similar to a traditional acoustic guitar. In other embodiments, the guitar controller can have a shape similar to a traditional electric guitar, a banjo or any other guitar like instrument. In the illustrated embodiment, the game console and display have connections to a power source (not shown). In a common embodiment, the guitar shaped game controller receives power from the game console. In other embodiments, the game controller communicates with the game console using wireless communication (e.g. radio frequency, infrared or the like). In such case, the game controller receives power from a conventional or rechargeable battery.

In operation, the game console receives a video game program from a game player or user (not shown) via the game media source. In one embodiment, the game media source is configured to receive a game in a compact disc form factor. In other embodiments, the game media source can accept other media formats. The processor can then load game related information from the game media source into the memory and execute instructions, generally read from the memory, for providing game interaction to the game player by causing display of game information on the game display via the display interface. In one embodiment, the game console causes display of player instructions on the game display indicating how the user can select a venue, character, virtual guitar, hairstyle, band and/or a song to be used in game play. The game console also causes display of player instructions on how to play the selected song. When the user is finished playing the game, the user can store the guitar shaped game controller. As a long neck makes the guitar shaped game controller difficult to store, a user can remove the neck for easy storage.

While the illustrated embodiment shows a single guitar controller, multiple guitar controllers can be connected to the game console. In such case, the game console can allow users to compete against one another, keeping separate score for the different users, or play cooperatively, providing a score common to all users, for example. In one embodiment, one user may play lead guitar, with appropriate instructions for song play displayed, and another user may play bass guitar, also with display of appropriate song instructions. In another embodiment, one user may play guitar while a second user plays another instrument.

Figure 2:
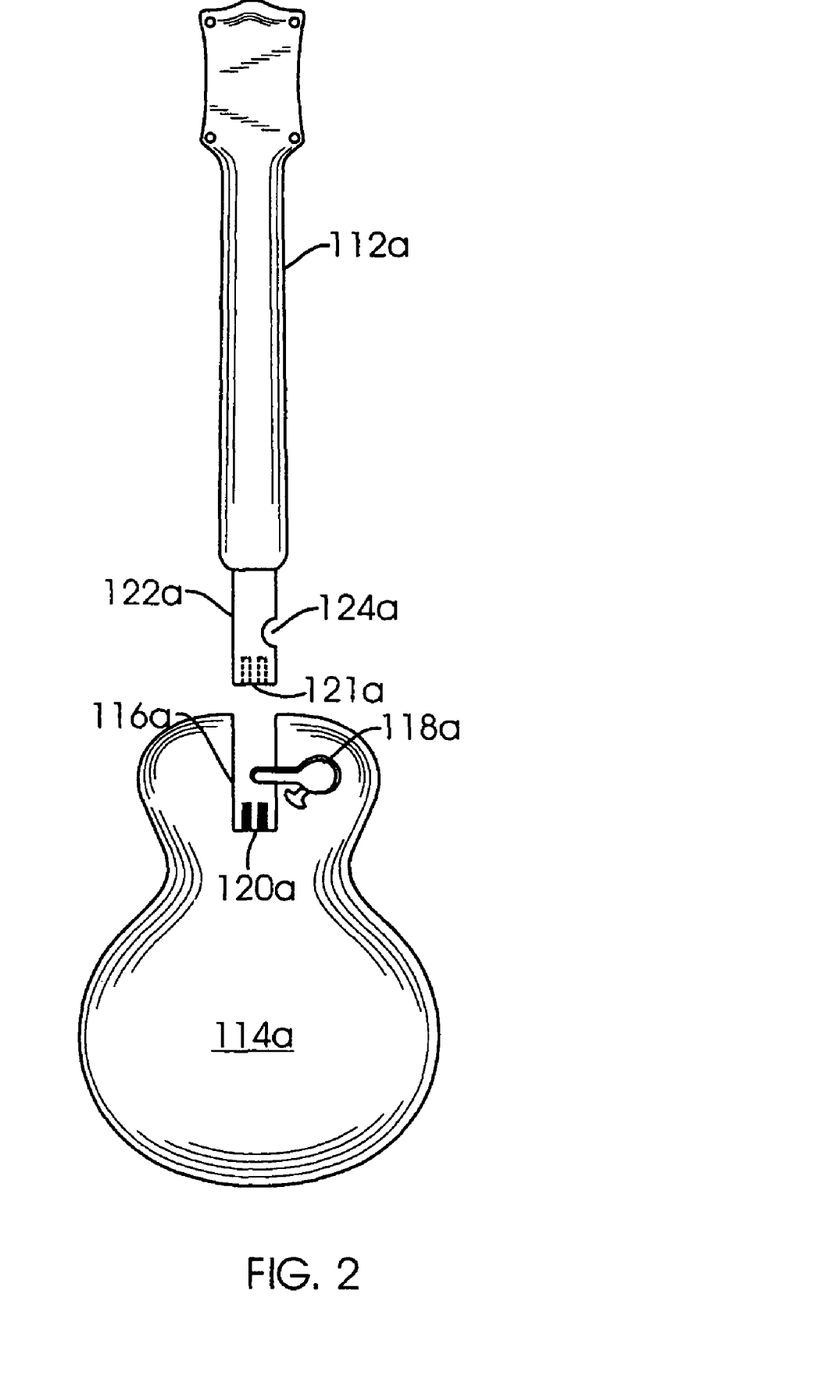
FIG. 2 is a rear view of a guitar shaped game controller having a removable neck and a latch structure in accordance with aspects of the invention.

FIG. 2 illustrates a rear view of a guitar shaped game controller having a removable neck and a latch structure in accordance with aspects of the invention. The guitar shaped game controller includes a neck 112a and a body 114a. The neck is roughly the shape of a guitar neck and includes a headstock at one end of the neck. The body is roughly the shape of a guitar body. In this regard it should be noted that guitar designers have arrived at a number of designs for guitar bodies, some ergonomically or acoustically useful and some entirely fanciful.

The body includes a cutout or an opening 116a about the top of the body. The body also includes a latch arm 118a about the opening. The body opening is configured to receive an insert portion 122a of the neck. The insert portion is disposed at the end of the neck opposite of the headstock and includes an indentation or notch 124a and an electrical connector 121a. The notch is disposed approximately midway along a side of the insert portion. The electrical connector 121a is disposed at the end of the neck opposite of the headstock. The latch arm is configured to releasably engage the notch when the neck is inserted into the opening. The latch arm can retain the insert portion of the neck within the opening of the body. The latch arm can similarly release the neck from the body. In other embodiments, the location of the opening, notch and latch arm can be varied.

The body also includes an electrical connector 120a in the opening. As illustrated, the electrical connector 120a is at a bottom of the opening and is configured to mate with the corresponding electrical connector 121a on the neck. As illustrated, the electrical connector of the neck is disposed at the bottom of the insert portion, although the electrical connectors may be placed in other corresponding positions in various embodiments. Thus, when the neck is coupled to the body, the electrical connector of the neck and the electrical connector of the body are coupled together.

In one embodiment, the neck, instead of the body, includes a latch and the body, instead of the neck, has a notch configured to engage the latch on the neck. In other embodiments, the latch can secure the neck to the body in other ways.

Figure 3:
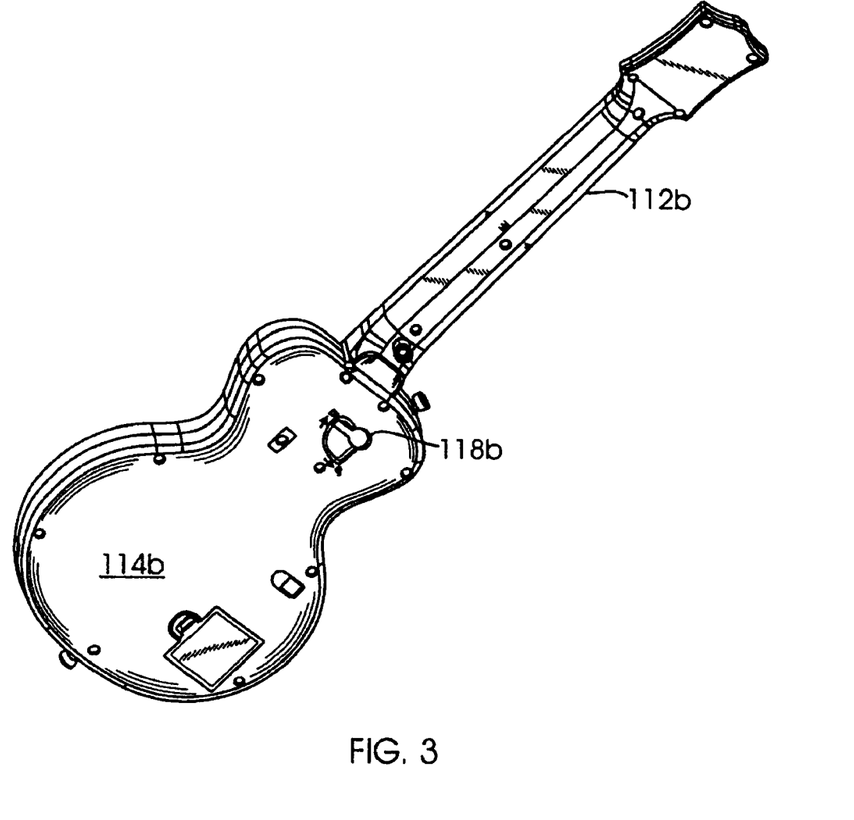
FIG. 3 is a perspective rear view of a guitar shaped game controller having a removable neck and a latch structure in accordance with aspects of the invention.

FIG. 3 illustrates a perspective rear view of a guitar shaped game controller having a removable neck and a latch structure in accordance with aspects of the invention. The guitar shaped game controller includes a body 114b and a neck 112b. The body includes a latch arm 118b for securing the neck to the body of the controller. In the illustrated embodiment, the neck is fully inserted into the body and secured by the latch arm.

Figure 4:
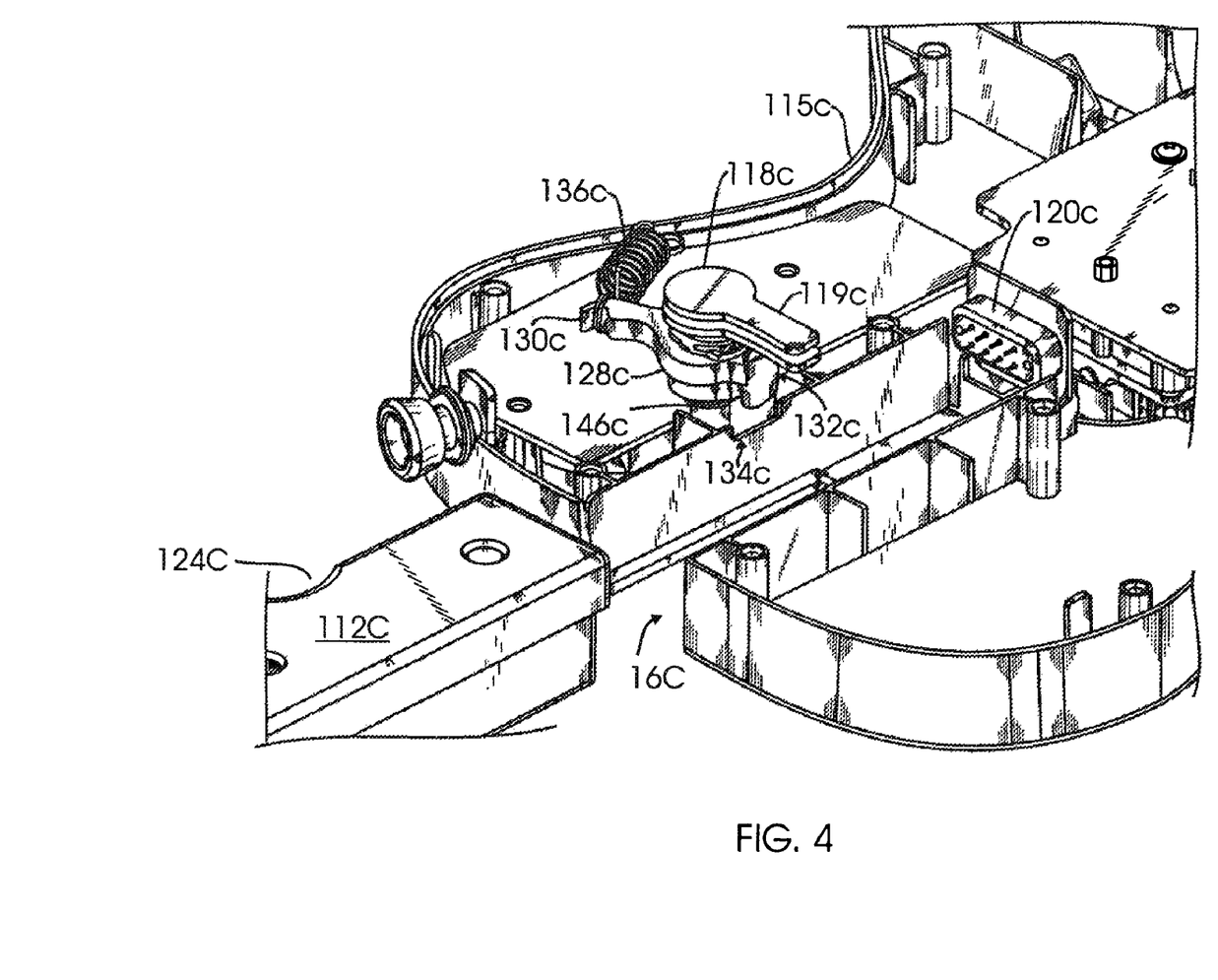
FIG. 4 is a perspective bottom view of a portion of the body of a guitar shaped game controller having the back cover removed and a removable neck in accordance with aspects of the invention.

FIG. 4 illustrates a perspective bottom view of a portion of a body of a guitar shaped game controller having the back cover removed and a removable neck in accordance with aspects of the invention. The guitar shaped game controller includes a neck 112c and a body 115c. The neck includes a notch 124c for engaging a latch arm 132c of the body. In the illustrated embodiment, the notch takes the form of an arc shaped cutout. In other embodiments, the notch can take other shapes appropriate for receiving a latch arm. The body includes a rectangular shaped opening 116c for receiving the neck, the latch arm 132c for securing the neck to the body using the notch, a multi-position electrical connector 120c for connecting inputs associated with the neck to components in the body and a spring 136c for retaining the latch arm in, or bringing the latch arm to, a default or home position.

The opening, as illustrated, is shaped like a rectangular box with two long sides, a top (the back cover functions as a top but is removed in the illustrated embodiment), a partially open bottom which is configured to receive a portion of a fret board of the neck (see FIG. 1), and two short sides. One of the two short sides is omitted such that the opening is configured to receive an insert portion of the neck. The multi-position electrical connector is mounted on the other short side of the opening. One of the two long sides includes a cutout portion 134c which is configured to receive the latch arm 132c. The cutout portion is also configured to align with the notch when the neck is fully inserted into the body.

The latch arm 132c is coupled to a latch mechanism 118c. The latch mechanism includes a latch release 119c, a latch cylinder 146c and a keyed retaining unit 128c. The keyed retaining unit is coupled to the latch release and latch cylinder such that they rotate together about an axis along the center line of the latch cylinder. The keyed retaining unit includes a spring arm 130c opposite of the latch arm or member 132c. In the illustrated embodiment, the spring arm is longer than the latch arm. In other embodiments, the spring arm and latch arm can take different lengths. The spring arm has a u-shape at the end of the arm for attaching to and retaining the spring. The spring is retained by the spring arm on one end and attached to a mounting post within the body on the other end.

In one embodiment, the latch arm has a home or default position such that the latch arm and latch mechanism will return to the home position if the latch arm is free to rotate. In one embodiment, the latch arm extends in part through cutout 134c in the home position. Also in the home position, the latch arm can extend in part into the notch when the neck is fully inserted. The neck is secured to the body in the home position when the neck is fully inserted into the body and the notch aligns with the cutout. From the inserted position, the user of the guitar shaped game controller can remove the neck.

To remove the neck, the user applies a force to the latch release to rotate the latch arm and latch mechanism counter clockwise. The force rotates the latch arm away from the cutout and the away from the notch. After a predetermined amount of rotation, the latch arm is fully removed from the notch and the neck can be removed. When the user force has been removed from the latch release, the spring applies a counter force returning the latch arm and latch mechanism to the home or return position.

To attach the neck, the user inserts the neck into the opening. In one embodiment, the neck pushes the latch arm away from the home position and into the body via the cutout 134c as the neck is inserted by the user. In another embodiment, the user applies a force to the latch release before inserting the neck. After the neck is fully inserted, the spring provides a clockwise force to the latch mechanism such that the latch arm extends through cutout and into notch to secure the neck to the body when the user releases the latch release. In one embodiment, a clicking sound accompanies and confirms the latching action.

In the illustrated embodiment, the multi-position connector includes eight electrical contacts. These contacts can connect to the fret buttons 113 (see FIG. 1). In other embodiments, the multi-position connector can include more than or less than eight contacts and can connect components other than the fret buttons. In one embodiment, the electrical contacts are pins. In another embodiment, the electrical contacts are pogo pins.

In one embodiment, the neck communicates with the body using wireless communication. For example, the neck can have a wireless transmitter that transmits data using any method known in the art (e.g. radio frequency, infrared and the like). In such case, the body can have a wireless receiver configured to receive the data transmitted from the neck. In another embodiment, the neck and body can each have wireless transceivers configured to communicate with each other.

In the illustrated embodiment, the notch 124c is an arc shaped cutout. The latch arm is configured to engage with the notch via the cutout in the wall of the body opening. In the illustrated embodiment, the latch arm has a rounded protruding shape which is configured to engage the notch on the neck. In other embodiments, the notch and latch arm can take other appropriate forms to secure the neck to the body.

In the illustrated embodiment, the latch release releases the neck from the body. In other embodiments, other latch mechanisms can be used. For example, a release button can be used instead of a latch release in one embodiment. Other methods of attachment and release can be used in other embodiments.

Figures 5, 6:
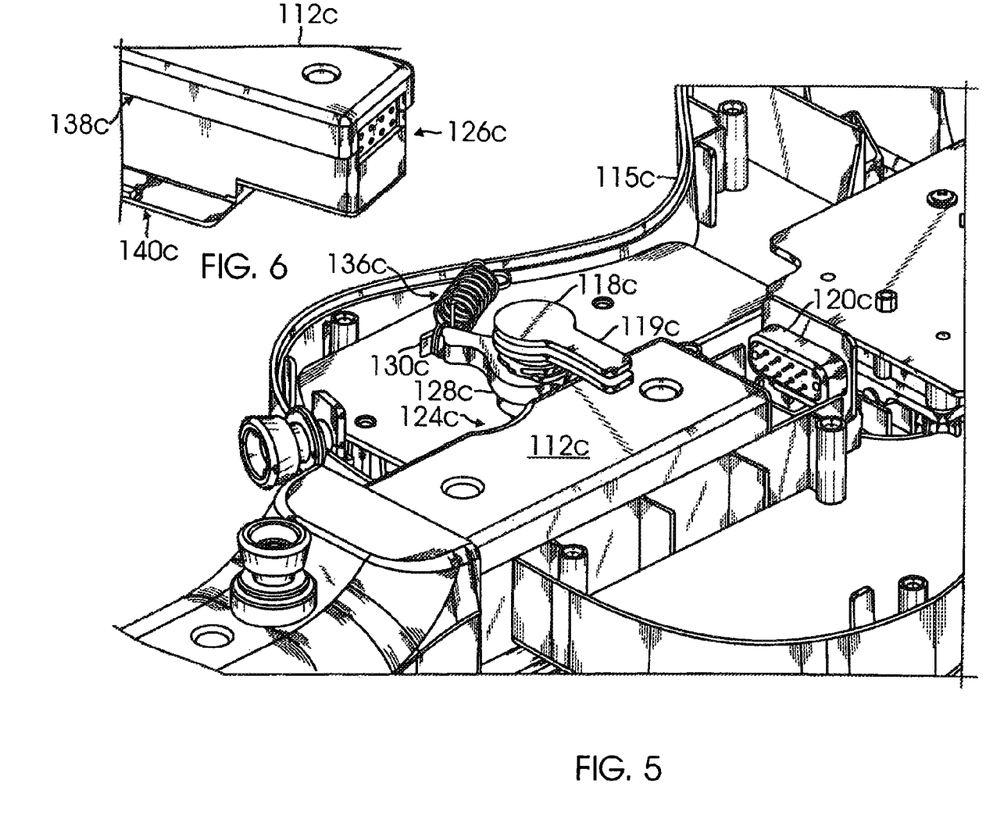
FIG. 5 is a perspective bottom view of a portion of the body of a guitar shaped game controller having the back cover removed and engaged with a removable neck in accordance with aspects of the invention.
FIG. 6 is a perspective rear view of the insert portion of the removable neck of FIG. 5 in accordance with aspects of the invention.

FIG. 5 illustrates a perspective bottom view of a portion of the body of a guitar shaped game controller having the back cover removed and engaged with a removable neck in accordance with aspects of the invention. In the illustrated embodiment, the insert portion 112c of the neck is almost fully inserted into the body 115c.

FIG. 6 illustrates a perspective bottom view of the insert portion of the removable neck of FIG. 5 in accordance with aspects of the invention. The insert portion of the removable neck 112c includes a multi-position connector 126c at an end, a rectangular protrusion 138c on the sides and a fret board surface 140c on a top. The multi-position connector 126c is configured to couple with the multi-position connecter 120c of the body. In the illustrated embodiment, the multi-position connector includes eight electrical contacts. These contacts can connect to the fret buttons 113 (see FIG. 1). In other embodiments, the multi-position connector can include more than or less than eight contacts and can connect components other than the fret buttons. In one embodiment, the electrical contacts are receptacles configured to couple with the contacts of the multi-position connector 120c of the body. In one embodiment, the receptacles are each configured to receive a pin, such as a pogo pin, for example. In another embodiment, the pins can be located on the neck and the receptacles can be located on the body.

The rectangular protrusions protrude from both sides of the insert portion of the neck. The fret board surface extends beyond the sides of the insert portion of the neck on the top. Together, the rectangular protrusions, extended fret board surface and sides of the insert portion of the neck form a rectangular channel on each side of the insert portion of the neck, similar to the channels on an I-beam. These rectangular channels are configured to receive the sides of the opening 116c (see FIG. 4) of the body.

Figure 7:
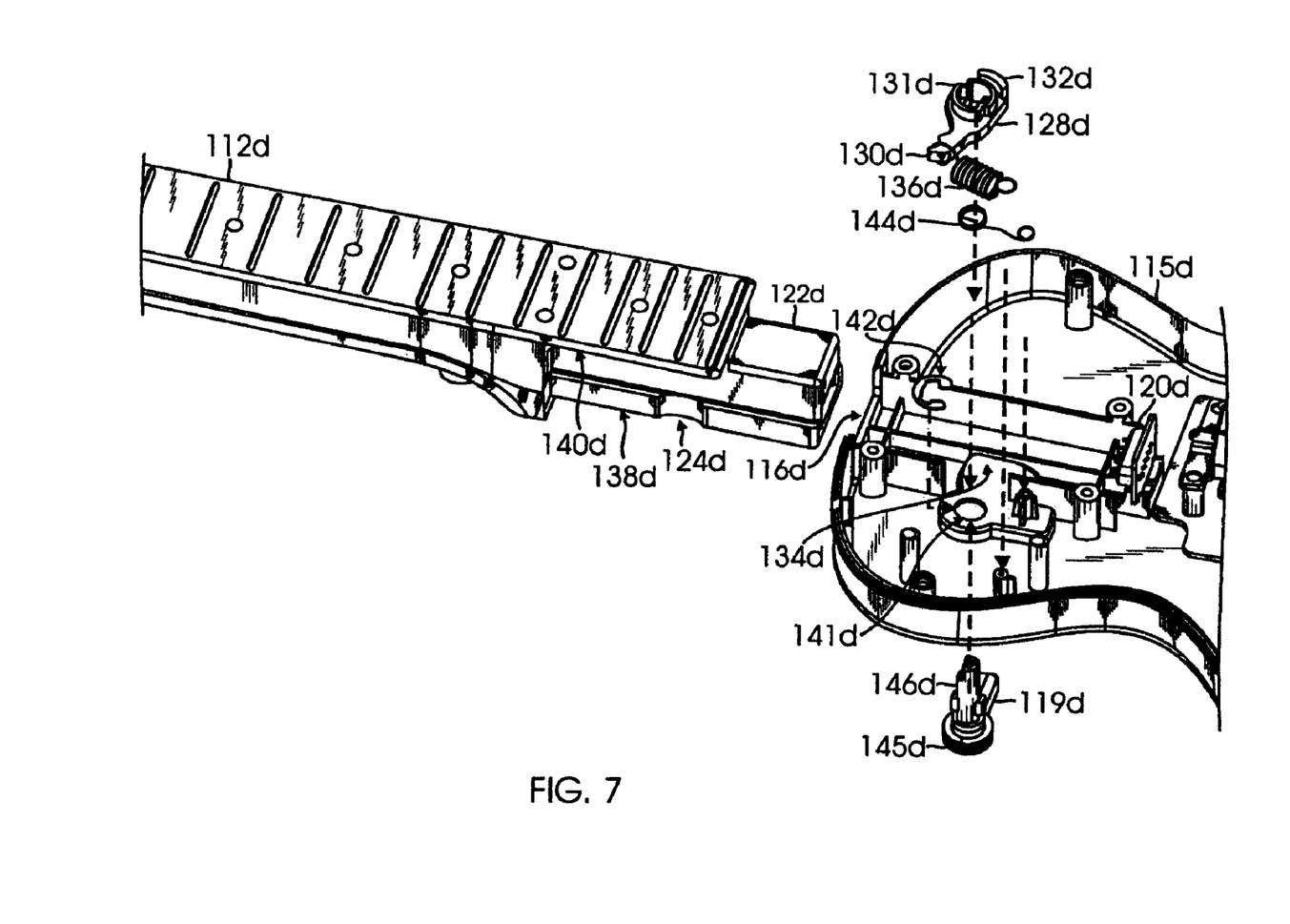
FIG. 7 is an exploded perspective top view of the body and removable neck of a guitar shaped game controller having a removable neck in accordance with aspects of the invention.

FIG. 7 illustrates an exploded perspective top view of the body of a guitar shaped game controller having a removable neck. The guitar shaped game controller includes a removable neck 112d and a body 115d. The neck is configured to engage with the body and includes an insert portion 122d having a notch 124d, a rectangular protrusion 138d and an extended fret board surface 140d. In one embodiment, the structure of the insert portion of the neck is as described above for FIG. 6. In the illustrated embodiment, the notch is located approximately midway along a side of the insert portion. The extended fret board surface is located on the top of the neck and extends from the headstock (not shown) onto the insert portion just past the notch.

The body includes a rectangular opening 116d for receiving the neck, a latch mount opening 141d for receiving a latch structure, retaining walls for resisting rotation of the latch structure past a predetermined point, and a latch structure for securing the neck to the body. The rectangular opening includes a cutout 134d disposed approximately midway along one side of the opening and a multi-position connector 120d disposed at the non-open end of the opening. The latch structure includes a latch cylinder structure 145d for providing a rotating latch release 119d to a guitar user, a circlip 142d for securing the latch cylinder structure within the body, a torsion spring 144d for providing a force opposing rotation from a home position, a keyed retaining unit 128d for coupling to the latch cylinder structure and for providing a retaining arm 132d, and a spring 136d also for providing a force opposing rotation from a home position. The latch cylinder structure includes the latch release 119d and a keyed mounting cylinder 146d. The keyed retaining unit includes a spring arm 130d, a key retainer 131d and the retaining arm 132d. The spring arm is configured to attach to the spring. The key retainer is configured to receive and retain the keyed mounting cylinder of the latch cylinder structure.

In one manner of assembly, the latch cylinder structure is inserted through the latch mount opening. The circlip is snapped onto the latch cylinder structure within the body such that it retains the latch cylinder within the body by resisting movement of the cylinder away from the body. The keyed retaining unit then slides onto the keyed mounting cylinder such that the opening on the keyed retaining unit aligns with the key on the mounting cylinder. Once the keyed opening receives and engages the keyed mounting cylinder, the latch cylinder structure and keyed retaining unit are coupled together such that they do not rotate independently of one another. The torsion spring slides onto the keyed mounting cylinder and a mounting unit of the body. The spring can then be attached to the spring arm and a mounting unit on the body.

Figures 8, 9:
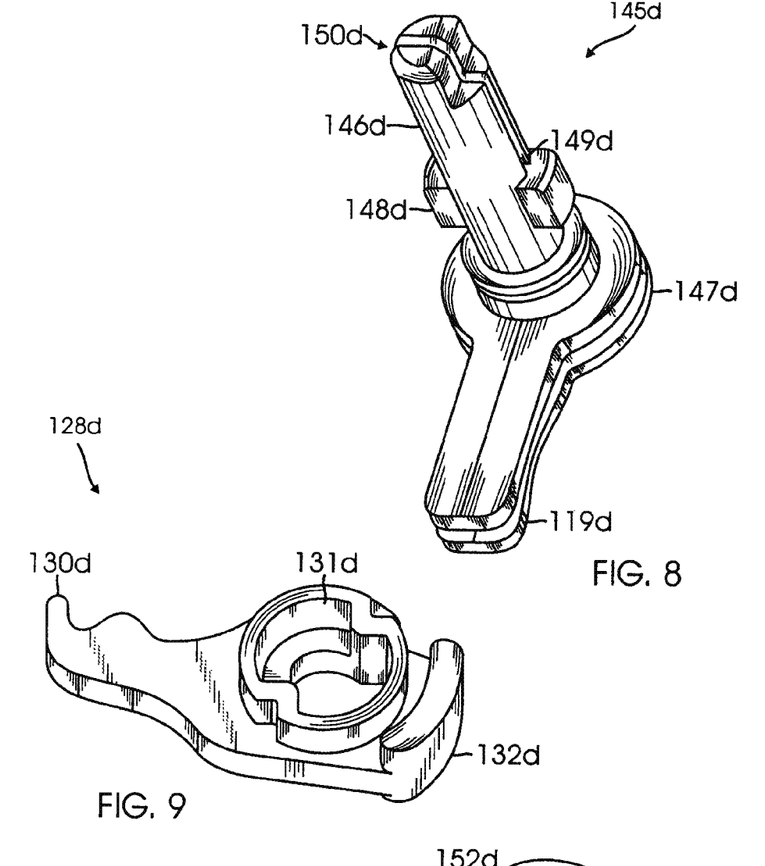
FIG. 8 is a perspective view of a latch cylinder structure in accordance with aspects of the invention.
FIG. 9 is a top perspective view of a keyed retaining unit in accordance with aspects of the invention.

FIG. 8 illustrates a perspective view of a latch cylinder structure in accordance with aspects of the invention. The latch cylinder structure 145d includes a circular top 147d for retaining the latch cylinder structure outside of the latch mount opening (see FIG. 7), the release arm 119d, and the keyed mounting cylinder 146d. The keyed mounting cylinder includes a key 148d for coupling the key retainer to the latch cylinder structure, a rectangular key opening 149d for mounting the key, and a slotted opening 150d for engaging the torsion spring. The release arm extends laterally away from the circular top. The keyed mounting cylinder extends perpendicular to the release arm and from the center of the circular body. The key is shaped like a rectangular block having rounded ends. The key slides into the key opening which is disposed approximately midway along the keyed mounting cylinder and is shaped to accommodate a tight fit with the rectangular key. Friction can retain the key within the key opening. In other embodiments, other methods of coupling the latch cylinder structure and the key retainer can be used. The slotted opening is disposed along a diameter line across a circular cross section of the cylinder and extends from the end opposite the circular top to just before the key opening. The slotted opening is configured to receive an end of the torsion ring 144d (see FIG. 7).

FIG. 9 illustrates a top perspective view of a keyed retaining unit in accordance with aspects of the invention. The keyed retaining unit 128d includes the spring arm 130d, the key retainer 131d and the retaining arm 132d.

Figure 10:
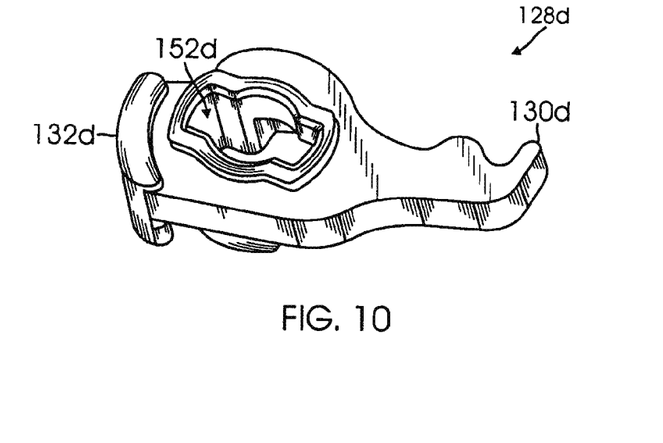
FIG. 10 is a bottom perspective view of the keyed retaining unit of FIG. 9.

FIG. 10 is a bottom perspective view of the keyed retaining unit of FIG. 9. The keyed retaining unit 128d includes the spring arm 130d, the key opening 152d and the retaining arm 132d. The key shaped opening is configured to allow the key 148d (FIG. 8) to pass through the retaining unit while the key retainer 131d is configured to retain the key once the keyed mounting cylinder 146d passes through the key opening 152d and is twisted slightly with respect to the keyed retaining unit. In this way, the key retainer secures the keyed retaining unit to the keyed mounting cylinder, once the cylinder is inserted and twisted slightly.

Returning now to FIG. 1, the guitar shaped game controller may have components including a removable front face plate 110.

Figure 11:
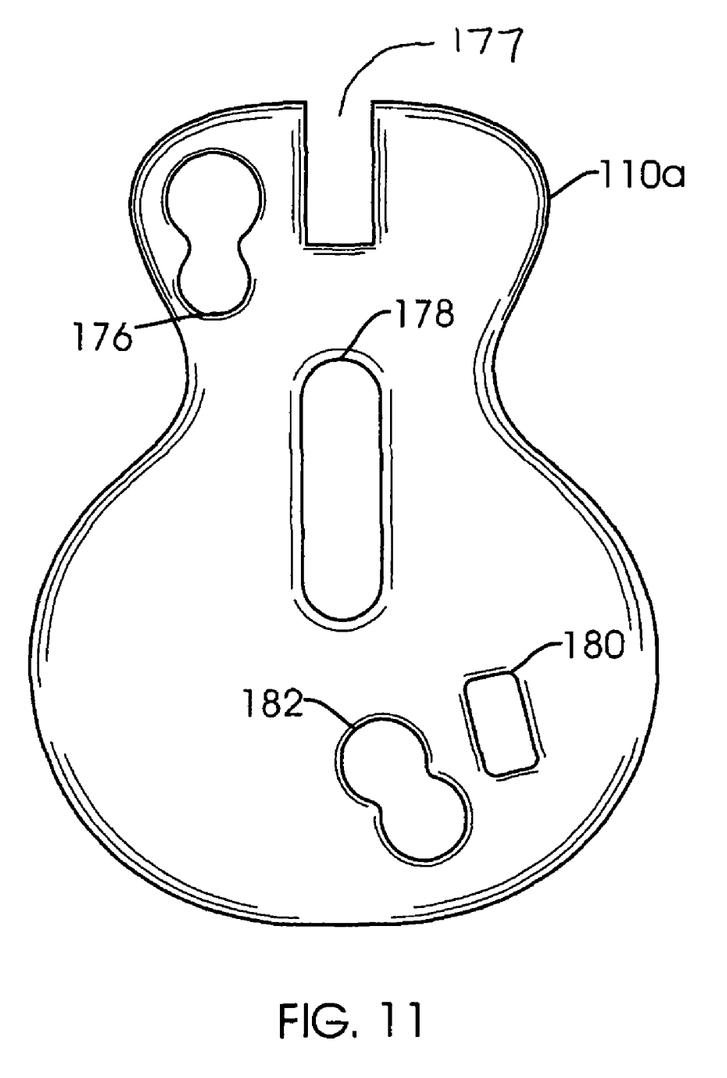
FIG. 11 is a top view of a detachable face plate for a guitar shaped game controller in accordance with aspects of the invention.

FIG. 11 illustrates a top view of a detachable face plate for a guitar shaped game controller in accordance with aspects of the invention. The detachable face plate 110a includes a control button cutout 176, a neck cutout 177, a strum bar cutout 178, a tremolo arm cutout 180 and a select button cutout 182. The face plate includes a rounded shoulder portion that includes the neck cutout at a top of the rounded shoulder portion and a bottom portion opposite the neck cutout. The neck cutout provides a rectangular opening in the face plate for the neck and is disposed at roughly the top and center of the shoulder portion.

A portion of the rounded shoulder portion to the left of the neck cutout, or left shoulder portion, includes the control button cutout, which provides a peanut shaped opening in the face plate for control buttons. The strum bar cutout is disposed substantially in the center of the face plate and along a center line of the face plate, where the center line bisects the face plate along the length of the face plate. The strum bar cutout provides a rectangular opening having rounded ends in the face plate for a strum bar. The bottom portion comprises the tremolo arm cutout and select button cutout disposed along the edge of the face plate and convenient for activation by a right hand of a right handed guitar player. The tremolo arm cutout provides a rectangular opening in the face plate for a tremolo arm, and the select button cutout provides a peanut shaped opening in the face plate for the select buttons. In the illustrated embodiment, the tremolo arm cutout is located below the select button cutout with respect to the right handed guitar player.

In one embodiment, the detachable face plates can have different colors, designs, artwork, logos, characters and/or musicians displayed. In this way, a user can customize a guitar controller to suit the individual preferences or style of the user.

Figure 12:
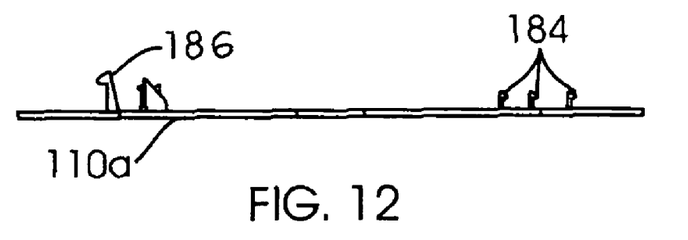
FIG. 12 is a side view of the detachable face plate shown in FIG. 11.

FIG. 12 illustrates a side view of the detachable face plate shown in FIG. 11. The detachable face plate 110a includes three small retainers 184 and a large retainer 186 for securing the face plate to the body (see FIG. 1). The three small retainers and large retainer can each have a body portion extending roughly perpendicular to a bottom surface of the face plate. At the end of the body portion, each retainer can have a protruding tab substantially parallel to the bottom surface of the face plate. The protruding tabs are configured to engage retaining structures in the body (not shown). In one embodiment, the large retainer structure can be thought of as a hook configured to engage with an opposing hook having a release mechanism.

In one embodiment, a lower portion of the face plate, or portion lower than the center line bisecting the face plate along the center lengthwise axis as the guitar controller is held by a right handed player, can include the small retainers. The large retainer can be disposed on the upper portion of the face plate, where the large retainer is configured to couple with a face plate release (not shown). The face plate release can be disposed on the back side of the body, or side opposite the face plate. In one embodiment, the large retainer and face plate release can be thought of as opposable hooks. When the user engages the face plate release, the large retainer is configured to disengage with the release mechanism hook. With a slight twisting motion, the user can remove the face plate. To attach the face plate, the user engages the small retainers with the body, pivots the face plate from the point of contact with the body and engages the large retainer with the face plate release hook on the body. In other embodiments, other methods of attachment and release for plastic components known in the art can be used. In other embodiments, more than one large retainer can be used and more than or less than three small retainers can be used.

Returning again to FIG. 1, the guitar shaped game controller may have a number of inputs and outputs for controlling game play. These inputs and outputs enable the user to provide instructions to the game console and to respond to instructions provided by the video game executing on the game console.

Figure 13:
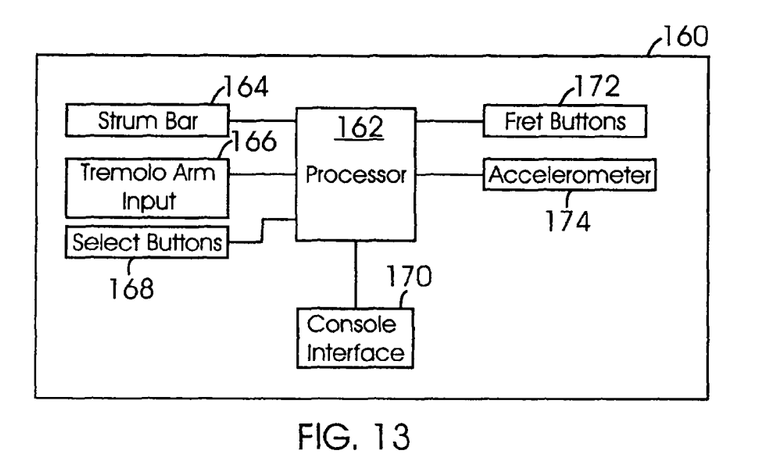
FIG. 13 is a schematic block diagram of a guitar shaped game controller in accordance with aspects of the invention.

FIG. 13 illustrates a schematic block diagram of a guitar shaped game controller in accordance with aspects of the invention. The guitar shaped game controller 160 includes a processor 162, a strum bar 164, a tremolo arm input 166, one or more select buttons 168, a console interface 170, one or more fret buttons 172 and an accelerometer 174. The processor is connected to the strum bar, the tremolo arm input, the one or more select buttons, the console interface, the one or more fret buttons and the accelerometer. The processor can determine input information such as which inputs have been activated and at what time. The processor can provide this input information to the game console via the console interface. The console interface 170 is configured to connect with the input interface 206 (FIG. 1) of the game console. In one embodiment, the console interface 170 is configured to communicate wirelessly with the input interface 206. In one embodiment, the accelerometer can be replaced by a generic position sensing input. In another embodiment, the accelerometer is omitted. In one embodiment, the accelerometer senses acceleration in one axis, two axes or three axes. In one embodiment, the select buttons include one or more control buttons.

In operation, the user can use the strum bar, tremolo input, select buttons, accelerometer and fret buttons to provide input or instructions to the game console and to respond to instructions from the game console. To play a note, a user can press one or more fret buttons to specify the particular note as indicated on the display in accordance with the video game being executed on the game console. At the same time a fret button is depressed, the user can strum on the strum bar to play the note. As a particular note is being played, the user can operate the tremolo arm input to bend and/or otherwise change the sound of the particular note. A user can use the select buttons and/or the fret buttons to select game options including a particular song that the user would like to play, the guitarist character to display, the instrument to display, the venue and/or other game options. The accelerometer can provide information to the processor concerning the position and orientation of the guitar controller as the user holds and/or moves the guitar.

Figure 14:
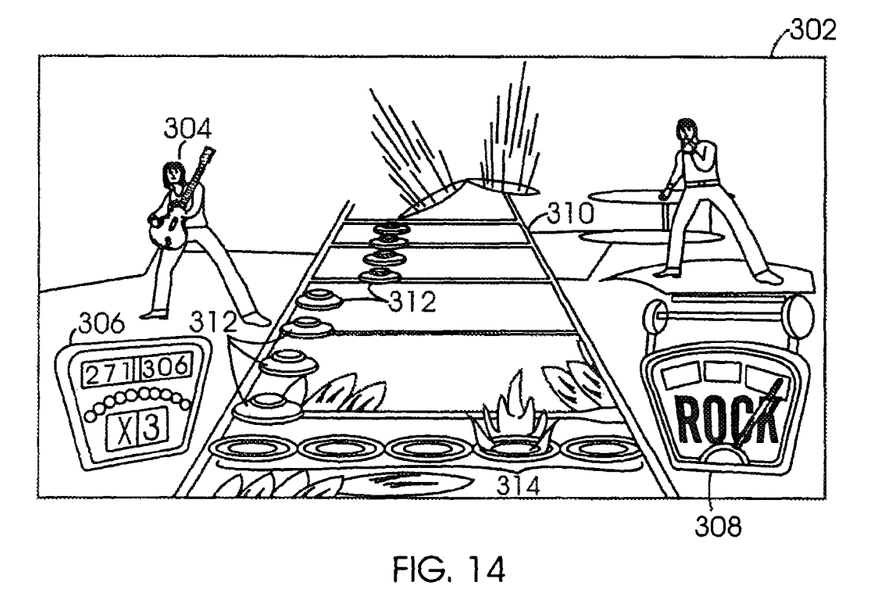
FIG. 14 is a screen shot of a video game played in conjunction with a guitar shaped game controller in accordance with aspects of the invention.

FIG. 14 illustrates a screen shot of a video game played in conjunction with a guitar shaped game controller in accordance with aspects of the invention. The screen shot 302 includes a guitarist 304, score indicator 306, a performance indicator 308, a scrolling fret board 310, note indicators 312 and scoring units 314. The user can select the character to be depicted as the guitarist and the type of guitar to be played by the guitarist. The guitarist can be moved both in response to movements of the guitar shaped game controller, as detected by the accelerometer, or in response to button combinations by the user at predetermined times related to the video game being played. In some embodiments, the guitarist moves independent of actions the user takes. In one embodiment, the character selected by the user can perform special movements unique to that character. For example, a particular guitarist character can perform a sequence of moves like a guitar solo that is unique to that guitarist.

In operation, the scrolling fret board contains a number of note indicators 312 that correspond to notes in a song to be played by the user. The note indicators can vary according to color. The color of the notes correspond to the color of the fret buttons on the neck of the game controller. As the notes scroll from the top to the bottom of the screen, visually it may appear to the user that the notes are scrolling towards the user, the user can play the notes by pressing the appropriate fret buttons and strumming on the strum bar when the scrolling notes are located at the same position as the scoring units 314. The color of each of the scoring units correspond to both the notes and the fret buttons. For example, the notes in the left most column of scrolling notes can be green. In such case, a user presses the green fret button and strums on the strum bar just as the green note crosses the left most green scoring unit. Points are scored when the user plays one or more notes at the indicated time. The scoring indicator 306 shows the number of points accumulated by user.

The processor of the game console can keep track of points scored. In one embodiment, the processor keeps a total of the points scored for a particular song and displays it on the display. The processor can also store points for a user's career, or a set of songs. In some embodiments, the processor applies special score multipliers to the users score at particular times and displays the score multipliers on the screen. In one embodiment, the processor applies a score multiplier when the user plays a predetermined number of consecutive notes correctly. The processor can also increase point scoring opportunities for the user at particular times. In one embodiment, the scoring opportunities are increased during a song when the processor displays a special message to the user. In one embodiment, the user responds by moving the guitar controller to a predetermined position or in a predetermined manner. For example, the user can place the guitar in an upright position in one embodiment, or move it rapidly in another embodiment. In either such case, the processor affords the user more points than during other modes of play.

In addition to the points scored, a user can get both aural and visual feedback from the crowd based on how well the user is playing the notes in a song. In the event that the user is not playing the notes at all or playing at the indicated time, the crowd feedback can be negative. The negative feedback can accumulate to the extent that game play at a particular venue is stopped and the guitarist is effectively booed off of the stage. In the event that the user is hitting each note at the indicated timing, the crowd feedback can be positive. In either case, the performance indicator or "Rock Meter" can display the level of crowd feedback to the user. The right most position on the performance indicator or gauge can be colored green for very positive feedback and the left most position can be colored red for very negative feedback. The game display can further include the crowd, a stage, the band members other than the "lead" guitarist and any other things that are common to a stage at a rock concert or similar event. In a two player game, two guitarists can be displayed. In one embodiment, one guitarist plays the lead guitar and one guitarist plays bass guitar.

Accordingly, the invention provides for a guitar shaped game controlled having a removable neck. Although the invention has been described with respect to certain embodiments, it should be recognized that the invention may be practiced other than as specifically discussed, and the invention comprises the claims and their insubstantial variations supported by this disclosure.

What is claimed is:

1. A game controller for a video game system in the shape of a guitar, comprising:
   a body section generally in the shape of a body of a guitar, the body section including a cutout and a first electrical connector;
   a latch arm structure coupled to the body section about the cutout;
   a spring coupled to the latch arm structure and configured to bias the latch arm structure to a home position; and
   a neck section generally in the shape of a guitar neck and a headstock, the neck section including:
   a portion insertable into the cutout of the body section, the portion including an indentation positioned so as to be approximate the latch arm structure when the portion is inserted into the cutout of the body section, the indentation configured to receive at least a portion of the latch arm structure;
   a second electrical connector having one or more contacts, the second electrical connector configured to couple with the first electrical connector when the portion is inserted into the cutout of the body section; and
   one or more fret buttons, where each of the one or more fret buttons is electrically connected to at least one of the one or more contacts.

2. The game controller for a video game system of claim 1, wherein the latch arm structure is configured to releasably secure the neck section to the body section.

3. The game controller for a video game system of claim 1: wherein the latch arm structure comprises:
   a cylindrical shaft;
   a release arm extending from the cylindrical shaft; and
   a retaining arm extending from the cylindrical shaft; and wherein the latch arm structure is configured to rotate about a center axis of the cylindrical shaft.

4. The game controller for a video game system of claim 3, wherein the indentation is configured to receive a portion of the retaining arm.

5. The game controller for a video game system of claim 4, wherein the retaining arm is positioned such that indentation receives a portion of the retaining arm in the home position.

6. The game controller for a video game system of claim 1, wherein the body section includes a strum bar.

7. The game controller for a video game system of claim 6, wherein the body section further comprises a tremolo arm and one or more control buttons.

8. The game controller for a video game system of claim 7, wherein the body section includes a removably attached face plate comprising cutouts for at least one of the strum bar input, the tremolo arm and the one or more control buttons.

9. The game controller for a video game system of claim 1, wherein the body section includes a removably attached face plate.

10. A game controller for a video game system in the shape of a guitar, comprising:
   a body section generally in the shape of a body of a guitar, the body section including a cutout;
   a latch arm structure coupled to the body section about the cutout;
   a spring attached to the latch arm structure and configured to bias the latch arm structure to a home position; and
   a neck section generally in the shape of a guitar neck and a headstock, the neck section at least partially insertable into the cutout of the body section, the neck section comprising an indentation positioned so as to be approximate the latch arm structure when the neck section is inserted into the cutout of the body section, the indentation configured to receive at least a portion of the latch arm structure.

11. The game controller of claim 10, wherein the latch arm system is configured to secure the neck section to the body section and to release the neck section from the body section.

12. The game controller of claim 10:
   wherein the latch arm structure comprises:
   a cylindrical shaft;
   a release arm extending from the cylindrical shaft; and
   a retaining arm extending from the cylindrical shaft; wherein the latch arm structure is configured to rotate about the shaft; and wherein the indentation is configured to receive a portion of the retaining arm.

13. The game controller of claim 10, further comprising means for communicating information from the neck section to the body section.

14. The game controller of claim 13:
   wherein the neck section comprises at least one fret button; and
   wherein the information comprises information indicative of a depression of the at least one fret button.

15. The game controller of claim 13, wherein the means for communicating information from the neck section to the body section comprises:
   means for transmitting the information to the body section; and
   means for receiving the information from the neck section.

16. The game controller of claim 15:
   wherein the neck section comprises at least one fret button; and
   wherein the information comprises information indicative of a depression of the at least one fret button.

17. A game controller for a video game system in the shape of a guitar, comprising:
   a body section generally in the shape of a body of a guitar, the body section including a cutout and an indentation in the cutout; and
   a neck section generally in the shape of a guitar neck and a headstock coupled to a latch arm structure, the neck section at least partially insertable into the cutout of the body section;
   wherein the indentation and the latch arm structure are positioned so as to be approximate one another when the neck section is inserted into the cutout of the body section, with the indentation configured to receive at least a portion of the latch arm structure, and wherein a spring is attached to the latch arm structure and is configured to bias the latch arm to a home position.

18. A video game system comprising:
   a guitar shaped game controller for a video game system, comprising:
   a body section generally in the shape of a body of a guitar, the body section including a cutout;
   a latch arm structure coupled to the body section about the cutout;
   a spring attached to the latch arm structure and configured to bias the latch arm structure to a home position;
   a neck section generally in the shape of a guitar neck and head, the neck section at least partially insertable into the cutout of the body section, the neck section including an indentation positioned so as to be approximate the latch arm structure when the neck section is inserted into the cutout of the body section, the indentation configured to receive at least a portion of the latch arm structure;
   a game console configured to play a video game stored on a game media source and to receive data from the guitar shaped game controller; and
   a display configured to receive data from to the game console.

19. The video game system of claim 18:
   wherein the game console comprises:
   a processor; and a game media source reader connected to the processor; and
   wherein the processor is configured to receive player instructions from the game media source reader and to provide the player instructions on the display.

20. The video game system of claim 19:
   wherein the body section further comprises:
   a processor;
   a strum bar input connected to the processor;
   a tremolo arm input connected to the processor;
   one or more control buttons connected to the processor; and
   a first electrical connector having one or more first contacts connected to the processor;
   wherein the neck section further comprises:
   a second electrical connector having one or more second contacts and configured to couple with the first electrical connector; and
   one or more fret buttons, where each of the one or more fret buttons is connected to one of one or more second contacts;
   wherein each of the strum bar input, the tremolo arm input, the one or more control buttons and the fret buttons is configured to receive information from a player; and
   wherein the processor of the body section is configured to provide the information from the player to the game console.

21. The video game system of claim 20:
   wherein the player instructions on the display comprise a scrolling fret board having a plurality of notes and a plurality of scoring units; and
   wherein the game console is configured to compare the player instructions and the player information to determine a player performance and a player score.

22. The video game system of claim 21:
   wherein the player information comprises activation by the player of one or more of the strum bar input, the tremolo arm input, the one or more control buttons and the fret buttons.

23. A method of removing a neck of a guitar shaped game controller comprising:
the guitar shaped game controller comprising:
a body section generally in the shape of a body of a guitar and configured to connect to a game console capable of executing instructions for a video game;
a latch arm structure coupled to the body section, the latch arm structure coupled to a spring configured to bias the latch arm to a home position;
the neck section generally in the shape of a guitar neck and head, the neck section at least partially insertable into the body section;
applying force to the latch arm structure to overcome the bias and move the latch arm structure out of the home position; and
pulling the neck section away from the body section.

* * * * *

UNITED STATES PATENT AND TRADEMARK OFFICE
CERTIFICATE OF CORRECTION

PATENT NO.        : 8,182,342 B2  
APPLICATION NO.   : 12/020465  
DATED             : May 22, 2012  
INVENTOR(S)       : Guinchard et al.

Page 1 of 1

It is certified that error appears in the above-identified patent and that said Letters Patent is hereby corrected as shown below:

In column 14, line 21, delete "from to" and insert --from--, therefor.

Signed and Sealed this
Eighteenth Day of December, 2012

David J. Kappos
*Director of the United States Patent and Trademark Office*